United States Patent
Kawanoue (10) Patent No.: US 11,144,534 B2
(45) Date of Patent: Oct. 12, 2021

(54) CONTROL DEVICE, TIME STAMP MODIFICATION METHOD, COMPUTER PROGRAM, AND DATA STRUCTURE

(71) Applicant: OMRON Corporation, Kyoto (JP)

(72) Inventor: Shinsuke Kawanoue, Kyoto (JP)

(73) Assignee: OMRON Corporation, Kyoto (JP)

(*) Notice: Subject to any disclaimer, the term of this patent is extended or adjusted under 35 U.S.C. 154(b) by 204 days.

(21) Appl. No.: 15/952,378

(22) Filed: Apr. 13, 2018

(65) Prior Publication Data
US 2018/0329942 A1    Nov. 15, 2018

(30) Foreign Application Priority Data

May 9, 2017 (JP) .............................. JP2017-092830

(51) Int. Cl.
| | | |
|---|---|---|
| G06F 16/23 | (2019.01) | |
| G06F 1/14 | (2006.01) | |
| G06F 16/22 | (2019.01) | |
| G06F 16/2458 | (2019.01) | |
| G06F 17/40 | (2006.01) | |

(52) U.S. Cl.
CPC ........... *G06F 16/2365* (2019.01); *G06F 1/14* (2013.01); *G06F 16/2282* (2019.01); *G06F 16/2474* (2019.01); *G06F 16/2477* (2019.01); *G06F 17/40* (2013.01)

(58) Field of Classification Search
CPC ..................... G06F 16/2365; G06F 16/2477
See application file for complete search history.

(56) References Cited

U.S. PATENT DOCUMENTS

| | | | |
|---|---|---|---|
| 2008/0022116 A1 | 1/2008 | Akiyama | |
| 2008/0151762 A1* | 6/2008 | Armstrong | H04W 24/08 370/241 |
| 2009/0217274 A1* | 8/2009 | Corbin | G06F 16/2379 718/101 |

(Continued)

FOREIGN PATENT DOCUMENTS

| | | |
|---|---|---|
| CN | 101133401 A | 2/2008 |
| CN | 104380632 A | 2/2015 |

(Continued)

OTHER PUBLICATIONS

Martins et al., "A User-Driven and a Semantic-Based Ontology Mapping Evolution Approach", 2009, Knowledge Engineering and Decision Support Research Group, School of Engineering—Polytechnic of Porto, Porto, Portugal. (Year: 2009).*

(Continued)

*Primary Examiner* — Apu M Mofiz
*Assistant Examiner* — Sheryl L Holland
(74) *Attorney, Agent, or Firm* — Metrolex IP Law Group, PLLC (57) ABSTRACT

Data is recorded to a time-series database embedded in a PLC. A local clock of the PLC is corrected by accessing a time server such as an NTP server on a regular basis. At that time, a time correction amount and an NTP-ID for identifying each iteration of correction processing are recorded to an NTP log in association with each other. When a query arrives, a time stamp of a record corresponding to a designated time range is modified by proportionally distributing the time correction amount of the corresponding NTP-ID.

11 Claims, 9 Drawing Sheets

(56) References Cited

U.S. PATENT DOCUMENTS

| | | |
|---|---|---|
| 2013/0094372 A1 | 4/2013 | Boot |
| 2013/0124758 A1 | 5/2013 | Ree et al. |
| 2013/0343409 A1 | 12/2013 | Haulin |
| 2014/0153588 A1 | 6/2014 | Haulin |
| 2014/0320502 A1* | 10/2014 | Fletcher ............... G06T 11/206 345/440.2 |
| 2015/0127284 A1* | 5/2015 | Seshan ................... G01D 3/022 702/89 |

FOREIGN PATENT DOCUMENTS

| | | |
|---|---|---|
| CN | 105745604 A | 7/2016 |
| JP | 2015-201194 A | 11/2015 |
| WO | 2015/066578 A1 | 5/2015 |

OTHER PUBLICATIONS

The extended European search report dated Nov. 7, 2018 in a counterpart European Patent application.

The Chinese Office Action dated Jul. 27, 2020 for the counterpart Chinese Patent Application No. 201810316039.2, with English translation.

\* cited by examiner

| NTP-ID | Time stamp | Time correction amount |
|---|---|---|
| 342 | 2017-03-03-07:00:00.148 | + 0.315 sec |
| 343 | 2017-03-03-08:00:01.135 | + 0.205 sec |
| 344 | 2017-03-03-09:00:00.014 | + 0.305 sec |

FIG. 7

| Index | Time stamp | Counter | Data1 | Data2 | NTP-ID |
|---|---|---|---|---|---|
| 1 | 2017-03-03-08:00:00.013 | 101 | 0.875 | 13 | 342 |
| 2 | 2017-03-03-08:00:00.014 | 103 | 0.995 | 15 | 343 |
| 3 | 2017-03-03-08:00:00.015 | 105 | 0.889 | 16 | 343 |
| 4 | 2017-03-03-08:00:00.015 | 107 | 0.994 | 15 | 343 |
| ⋮ | ⋮ | ⋮ | ⋮ | ⋮ | ⋮ |
| 154 | 2017-03-03-09:00:00.014 | 209 | 0.678 | 14 | 344 |

| Index | Time stamp | Counter |
|---|---|---|
| 1 | 2017-03-03-08:00:00.013 | 101 |
| 2 | 2017-03-03-08:00:00.014 | 103 |
| 3 | 2017-03-03-08:00:00.015 | 105 |
| 4 | 2017-03-03-08:00:00.016 | 107 |

CONTROL DEVICE, TIME STAMP MODIFICATION METHOD, COMPUTER PROGRAM, AND DATA STRUCTURE

CROSS-REFERENCES TO RELATED APPLICATIONS

This application claims priority to Japanese Patent Application No. 2017-092830 filed May 9, 2017, the entire contents of which are incorporated herein by reference.

FIELD

An embodiment relates to a control device applicable to FA (Factory Automation), for example.

BACKGROUND

Many factories, physical distribution bases and the like are provided with a control system for controlling a diverse range of facilities and machines. Power savings and greater work efficiency can be attained, by appropriately operating a control system or a control device. PLCs (Programmable Logic Controllers) are well-known as control devices that can also withstand tough environments.

A PLC is a computer that has a processor and a memory and operates in accordance with a computer program. A study relating to programming languages for PLCs was spearheaded by IEC SC65B/WG7/TF3, and published in 1993 as the international standard IEC 61131-3. This standard prescribes "4 languages+1 element" including ladder language which has conventionally been the mainstay language, and recent PLCs have been developed in line with this standard. In IEC 61131-3, there is a program unit called a POU (Program Organization Unit). A POU approximates the concept of a class in an object-oriented language, and can include one or more FBs (Function Blocks) which are the equivalent to a function or a method.

Incidentally, recent PLCs have become highly developed, and are provided with ultra high-speed CPUs (Central Processing Units) and mass memories. It has thus become possible to implement applications that could not previously be implemented. Using PLCs as a database to store large amounts of data is one such example.

That is, collecting various types of data related to controlled objects (sensors, servo motors, etc.) at a frequency in the order of msecs (milliseconds), assigning a time stamp to the collected data, and storing the data in a time-series database embedded in a PLC is being considered. A time-series database is a database optimized to be able to process queries designating a period (time range) at high speed, and have recently attracted attention in fields such as AI (Artificial Intelligence) and IoT (Internet of Things). The time-series database can be utilized in predictive control that is based on machine learning, for example.

A problem here is the accuracy of the time stamps between time-series data collected by a plurality of PLCs. This is because the internal clock (local clock) of a PLC drifts due to disturbances such as temperature, and the degree of drift differs for each PLC.

For example, with the WWW (World Wide Web), time is synchronized between servers (sites), utilizing the NTP (Network Time Protocol). However, because the number of NTP servers is limited, the access frequency to an NTP server has to be kept to about once every hour at most. In a system in which the interval of the time stamps is an extremely short cycle, the time deviation therebetween can become intolerably large, and a solution to this problem is sought.

In JP 2015-201194A, the time stamps of real-time data are normalized by a plurality of devices exchanging time information, in an effort to maintain relative time synchronization between the devices. However, as the number of devices within the system increases, issues arise such as a greater communication load and a drop in efficiency. Also, synchronization between data is not guaranteed in the event of processing that integrates data across a plurality of systems (data mining). Furthermore, if there is an error in communication between devices, normalized time stamps cannot be calculated.

JP 2015-201194A is an example of background art.

As mentioned above, the possibility of constructing a time-series database in a control device and storing data collected at a high frequency with a time stamp attached thereto is being explored. However, the internal clock is not sufficiently accurate for the data collection cycle, and there is a risk that the time stamps will deviate between control devices. There are calls to enhance the accuracy of the time stamps of data, in order to also enhance the reliability and accuracy of subsequent data analysis and the accuracy of machine learning or data integration, for example.

One or more aspects have been made in view of the above circumstances, and an object thereof is to provide a control device capable of acquiring data to which an accurate time stamp has been assigned, a time stamp modification method, a computer program and a data structure.

SUMMARY

In one or more aspects, the following means are employed, in order to achieve the above object.

A first aspect is configured to include a local clock configured to provide a local time serving as a basis of a time stamp, a correction unit configured to repeatedly execute correction processing of the local time, a storage unit configured to store a time correction amount for each iteration of the correction processing, a data collection unit configured to collect data related to a controlled object, a database configured to store the collected data, with the time stamp attached to the data, an extraction unit configured to extract, from the database, data corresponding to a period designated by a query directed to the database, a modification unit configured to modify the time stamp of the extracted data, based on the time correction amount, and a response unit configured to send the data with the modified time stamp attached thereto to an issuer of the query.

Given such a configuration, the time correction amount for each iteration of the correction processing of local time that is executed on a regular basis, for example, is stored in the storage unit. Data related to a controlled object is collected by the data collection unit, and stored with a time stamp attached in a database. When a query directed to a database is received, data corresponding to the period designated by this query is extracted from the database. The time stamp of the extracted data is modified by the modification unit, based on the time correction amount. The data with the modified time stamp attached is then sent to the issuer of the query.

The time stamp that is attached to the data read out from the database is thereby modified before being sent to the query source. In other words, deviation in the time stamp caused by error that occurs in the internal clock is modified, and, accordingly, it becomes possible to acquire data accompanied by an accurate time stamp.

A second aspect is configured to cause the storage unit to store the time correction amount for each iteration of the correction processing in association with an identifier for identifying the iteration of the correction processing, to store a record that includes the data with the time stamp attached thereto and the identifier of the iteration of the correction processing of the local time from which the time stamp of the data derives in the database, and such that the modification unit acquires the time correction amount corresponding to the identifier included in the record that includes the extracted data, and modifies the time stamp of the extracted data, based on the acquired time correction amount.

Given such a configuration, the time correction amount of the correction processing is stored in association with an identifier for each iteration. The data with a time stamp attached thereto is stored in a database as a set with the identifier of the correction processing that resulted in the local time on which the time stamp is based. The modification unit acquires the time correction amount with reference to the identifier of the set (record) that includes the extracted data, and modifies the time stamp based on the value of the acquired time correction amount.

In other words, a time stamp and a reference (identifier) to a time correction amount for modifying this time stamp are stored in the database at one set. By using such a data structure, processing related to modification of time stamps is simplified, and effects such as ease of implementation or shortening of processing time can be obtained.

A third aspect is configured such that the modification unit modifies the time stamp based on a value obtained by interpolating the acquired time correction amount on a basis of a time at which the correction processing was executed.

Given such a configuration, the time stamp is modified based on a value obtained by interpolating the corresponding time correction amount, with reference to the time at which correction processing of the local time on which the time stamp is based was executed. For example, assume that correction processing is executed at 24 hour intervals, and that the time correction amount during the interval was 0.6 msec. In this case, the time stamp attached 12 hours after the previous correction processing will be modified by 0.3 msec. Similarly, in the case of a time stamp attached 8 hours after, the modification amount will be 0.2 msec.

That is, time stamps are corrected with a value obtained by proportionally distributing the time correction amount by the time period that has elapsed from the previous iteration. The number of significant figures contributing to modification of time stamps can thereby be markedly increased, and accuracy can be dramatically improved.

A fourth aspect is configured such that the database is a time-series database designed in preparation for responding to a query that includes designation of the period.

In this way, the responsiveness to a query designating a time range can be enhanced, by storing data in a time-series database.

A fifth aspect is configured such that the correction unit accesses a time server providing a global time and executes correction processing of the local time.

Given such a configuration, time stamps can be modified on the basis of a globally unified standard, by accessing an NTP server and referring to a global time, for example.

A sixth aspect is configured such that the data collection unit collects the data at a higher frequency than the frequency of the correction processing by the correction unit.

Given such a configuration, an aspect can also be applied to a system in which the data collection cycle is in the order of a few msecs, for example.

A seventh aspect is configured to further include a learning unit configured to create learning data related to accuracy of the correction processing by feedback learning that uses the time correction amount for each iteration of the correction processing, and such that the correction unit corrects the local time with reference to the created learning data.

Given such a configuration, learning data relating to the accuracy of past correction processing is created by the learning unit, and the local time is corrected with reference to the learning data. Accordingly, the accuracy of the internal clock itself can be improved, and the accuracy of the time stamps can therefore also be enhanced.

An eighth aspect is configured to further include a determination unit configured to determine a validity of the correction processing of the local time, and such that the correction unit disables correction processing that is determined to not be valid by the determination unit.

Given such a configuration, in cases such as where, for example, the time correction amount oscillates or the correction processing is executed with an incorrect time zone setting, this is determined by the determination unit and correction processing is disabled. Accordingly, continuation of a state in which correction processing is performed erroneously can be prevented.

A ninth aspect is a data structure of a record that is stored in a database provided in a device having a clock, the data structure including data related to a controlled object of the device, a time stamp assigned to the data, and an identifier for identifying correction processing of a time provided by the clock.

By using such a data structure, information indicating the iteration of correction processing in which the time was corrected can be managed collectively with individual data and time stamps. In other words, time correction processing is implemented on a regular basis (every hour, every 12 hours, or every 24 hours), for example, and each iteration of correction processing can be distinguished by consecutive numbers or the like. By including these consecutive numbers (exemplary identifiers) in the records, it is possible to specify the iteration of correction processing in which the time from which the time stamp of each record derives was corrected. This can be utilized to appropriately calculate the correction amount of time stamps.

According to one or more aspects, a control device capable of acquiring data to which an accurate time stamp has been assigned, a time stamp modification method, a computer program and a data structure can be provided.

DETAILED DESCRIPTION

Figure 1:
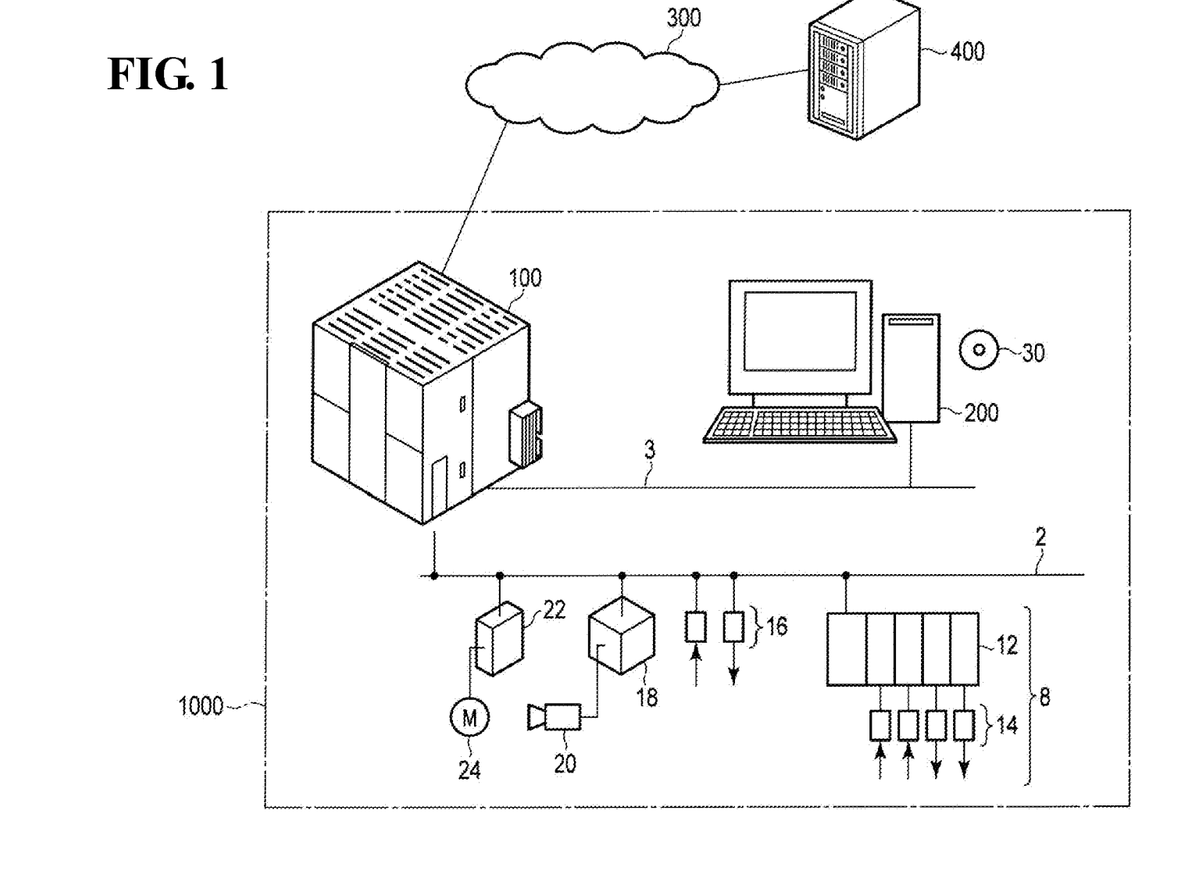
FIG. 1 is a diagram illustrating an example of a control system that includes a control device according to an embodiment.

FIG. 1 is a diagram showing an example of a control system that includes a control device according to an embodiment. The control system is installed in a base 1000 such as a factory or a distribution warehouse, for example. The control system is provided with a PLC 100 serving as an example of a control device and a computer (PC) 200 that is communicably connected to this PLC 100 via a LAN (Local Area Network) 3.

For example, it is possible for a computer program that includes a command for causing the PC 200 to execute a procedure or a method according to an embodiment to be installed on the PC 200 from a recording medium 30 such as a CD-ROM. The CD-ROM 30 is a medium capable of optically recording information such as computer programs in manner that enables a computer or another device, machine or the like to read the recorded programs or other information. In addition, it is also possible to use a medium that is capable of recording various types of data through an electrical, magnetic, mechanical, or chemical operation.

The PLC 100 is connected to a field bus 2 formed in the base 1000. A group 8 of field devices serving as examples of controlled objects is connected to the field bus 2. The field device group 8 includes a remote I/O (Input/Output) device 12, a relay group 14, an I/O unit 16, an imaging sensor 18, a camera 20, a servo driver 22 and a servo motor 24, for example. The field devices in this group 8 exchange various types of data related to control with the control device 100 via the field bus 2. The PLC 100 stores the acquired data in an embedded database.

A protocol capable of guaranteeing the arrival time of data is preferably employed for the field bus 2. Known networks that employ this type of protocol include EtherCAT(registered trademark), EtherNet(registered trademark)/IP, DeviceNet(registered trademark), CompoNet(registered trademark).

The PLC 100 is further provided with an interface capable of connecting to the network 300. A time server 400 that provides a global time is installed in the network 300. The PLC 100 accesses this time server 400 on a regular basis, and corrects the internal clock (real-time clock (RTC)) of the PLC 100 so as to be synchronized with the global time.

In an embodiment, the time server 400 is an NTP server connected to the Internet, for example. The NTP server acquires a global time synchronized with UTC (Coordinated Universal Time) from a radio clock or an atomic clock connected to a higher level time server. In other words, the PLC 100 is able to synchronize the internal clock with the global time, by accessing either an NTP server or a time server.

Figure 2:
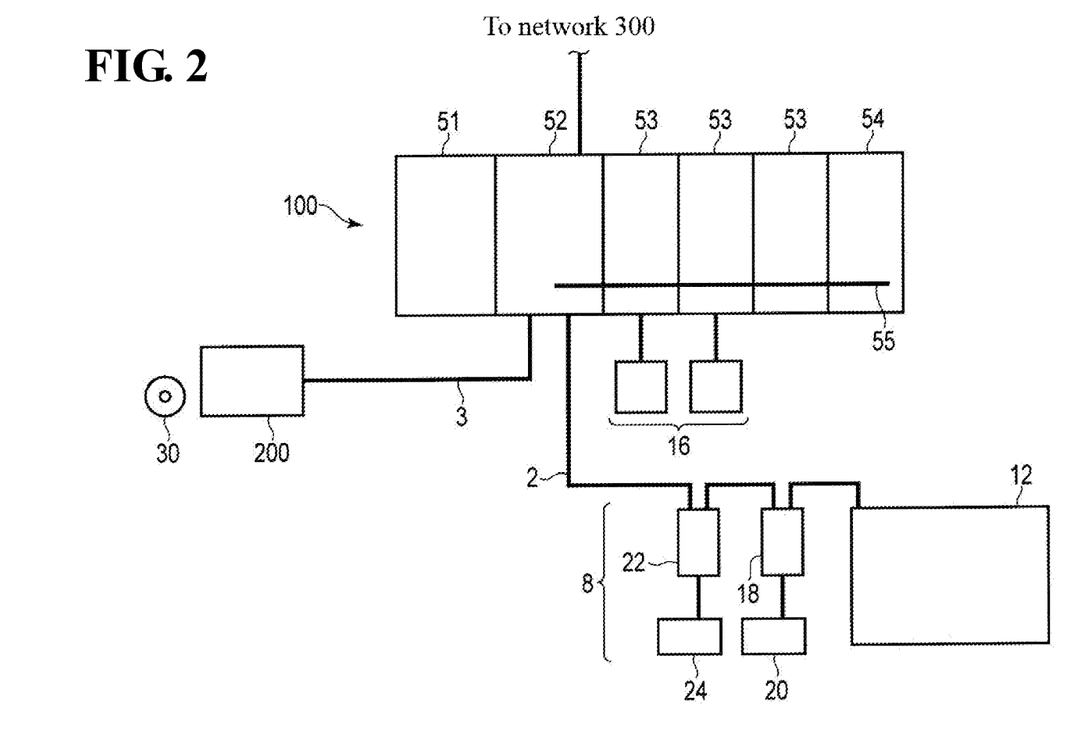
FIG. 2 is a block diagram illustrating an example of a control system according to an embodiment.

FIG. 2 is a block diagram showing an example of the control system shown in FIG. 1. As an example, the PLC 100 that is shown is what is known as a building block PLC that combines a plurality of units. In addition, package PLCs and base mounted PLCs are also known.

The PLC 100 is provided with a power supply unit 51, a CPU block 52, a plurality of I/O blocks 53, and a special block 54. Of these, the CPU block 52, the I/O blocks 53 and the special block 54 are connected by a system bus 55 provided within the device. By connecting these blocks together so as to enable data to be exchanged, the PLC 100 operates as a computer. In other words, the PLC 100 is a computer provided with a processor and a memory.

The power supply unit 51 of the PLC 100 supplies a drive voltage to the CPU block 52, the I/O blocks 53 and the special block 54.

The CPU block 52 is provided with a CPU and functions as the core of the PLC 100. The CPU block 52 is connected to the field bus 2 leading to the field device group 8 and the LAN 3 leading to the PC 200.

The I/O blocks 53 are connected to the I/O unit 16, and acquire generated data from a relay, a detection switch or the like, and sends the acquired data to the CPU block 52. This type of data related to control includes a diverse range of data such as the torque of a servo motor, the conveyance speed of goods (work) and the angle of a robot arm, for example. Such data is, of course, not limited thereto.

The special block 54 executes processing that is not supported by the power supply unit 51, the CPU block 52 or the I/O blocks 53. The special block 54 executes processing such as input and output of analog data, temperature control, and communication by a specific communication method, for example.

Figure 3:
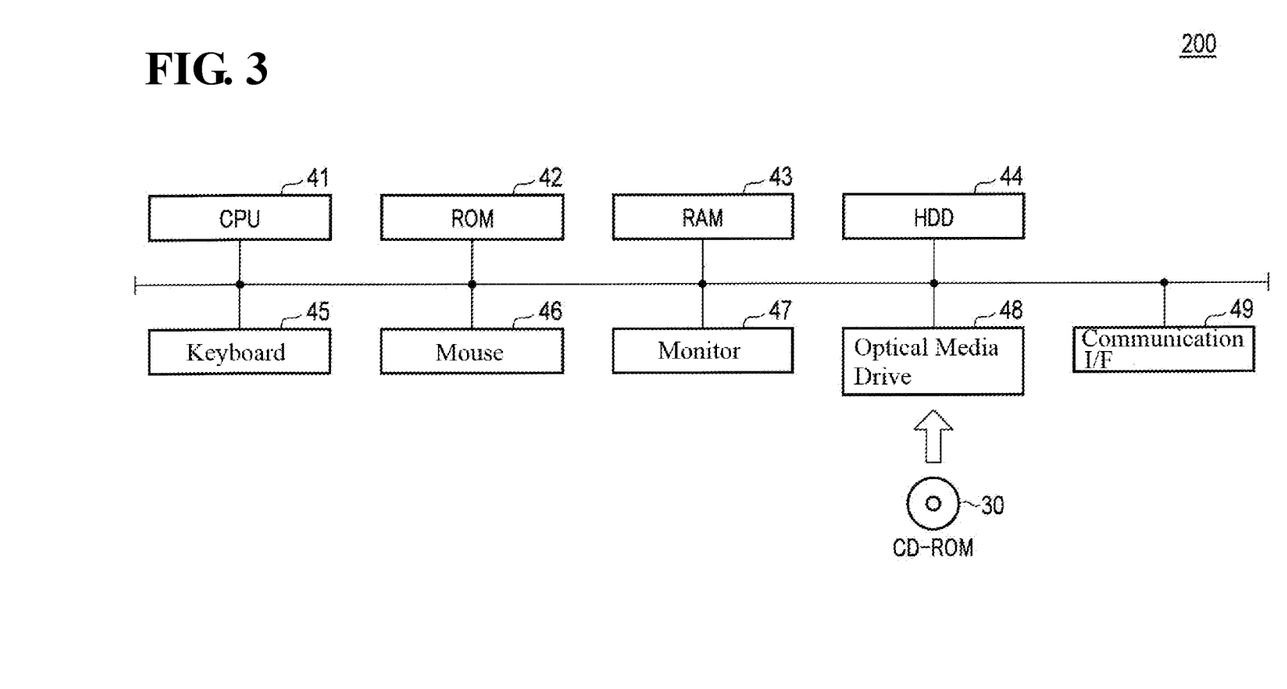
FIG. 3 is a block diagram illustrating an example of the hardware configuration of a computer.

FIG. 3 is a block diagram showing an example of the hardware configuration of the PC 200. The PC 200 is provided with a CPU 41, a ROM (Read Only Memory) 42, a RAM (Random Access Memory) 43, and a hard disk drive (HDD) 44. The CPU 41 corresponds to a computational unit of the PC 200. The ROM 42, the RAM 43 and the hard disk 44 correspond to storage units of the PC 200.

The CPU 41 executes various computer programs including an OS (Operating System). The ROM 42 stores a BIOS (Basic Input Output System) and various data. The RAM 43 temporarily stores data and computer programs loaded from the hard disk 44. The hard disk 44 stores data and computer programs to be executed by the CPU 41.

The PC 200 is further provided with a keyboard 45, a mouse 46, a monitor 47, an optical media drive 48, and a communication interface (I/F) 49. The keyboard 45 and the mouse 46 accept operations from a user. The monitor 47 visually displays various types of information. The optical media drive 48 reads digital data recorded on a recording medium such as the CD-ROM 30. A communication interface (I/F) 49 is connected to the LAN 3 and communicates with the PLC 100.

Various computer programs to be executed by the PC 200 can be recorded to the CD-ROM 30, for example, and distributed. The computer programs stored on this CD-ROM 30 are read by the optical media drive 48, and stored on the hard disk (HDD) 44 or the like. Alternatively, a configuration may be adopted in which computer programs are downloaded through a network from a high-order server computer or the like.

Figure 4:
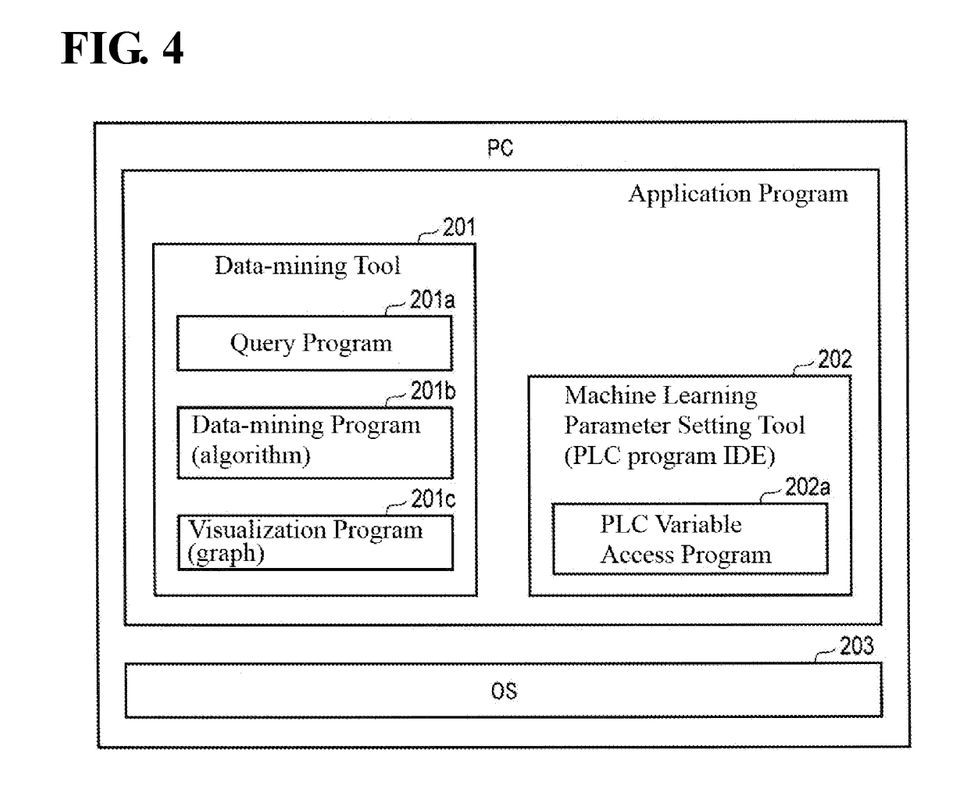
FIG. 4 is a block diagram illustrating an example of the software configuration of a computer.

FIG. 4 is a block diagram showing an example of the software configuration of the PC 200. The PC 200 is provided with a data-mining tool 201 and a machine learning parameter setting tool 202. The data-mining tool 201 and the machine learning parameter setting tool 202 are some of the application programs that operate under the control of an OS 203, for example. In other words, the PC 200 operates as the data-mining tool 201 and the machine learning parameter setting tool 202, as a result of the CPU 41 interpreting and executing computer programs loaded to the RAM 43 from the hard disk drive 44 (FIG. 3).

The data-mining tool 201 is provided with a query program 201a, a data-mining program 201b, and a visualization program 201c. The query program 201a creates queries for acquiring desired data from a time-series database. The data-mining program 201b processes data acquired as a result of queries based on a predetermined algorithm, and performs processing such as prediction processing related to control. The visualization program 201c performs processing such as displaying the results of data processing on a graph, and serves as part of the human machine interface with a person. A GUI (Graphical User Interface) environment can thereby be utilized, even with a PLC that does not have a UI (User Interface).

Using these blocks, the data-mining tool 201 executes processing such as determination of the feature amount in a query, determination of an anomaly detection technique, determination of machine learning parameters, or evaluation of an anomaly detection result.

The machine learning parameter setting tool 202 is provided by an Integrated Development Environment (PLC program IDE) for cross-developing a computer program for PLCs in compliance with IEC 61131-3, for example. The machine learning parameter setting tool 202 includes a PLC variable access program 202a. The PLC variable access program 202a accesses the PLC 100 and acquires various data (sensor data, data on the servo motor, etc.) mapped to variables.

Figure 5:
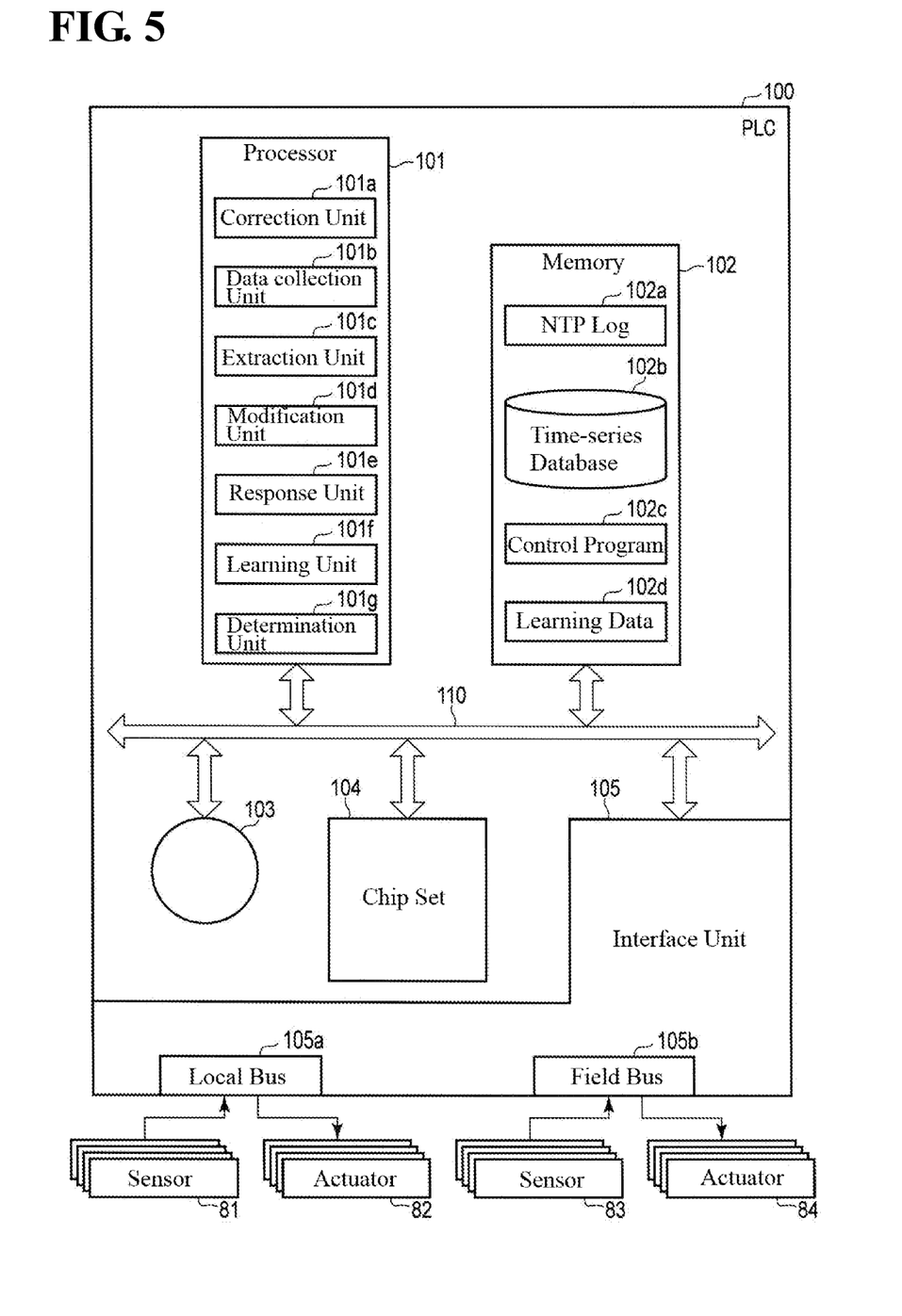
FIG. 5 is a block diagram illustrating an example of a PLC.

FIG. 5 is a functional block diagram showing an example of the PLC 100. The PLC 100 is provided with a processor 101, a memory 102, an internal clock 103, a chipset 104 and an interface unit 105. These constituent elements are connected via an internal bus 110. Note that the processor 101, the memory 102, the internal clock 103, the chipset 104 and the interface unit 105 are mounted in the CPU block 52 (FIG. 2), for example.

The internal clock 103 is a highly accurate pulse generator that is provided with a crystal oscillator and a PLL (Phase Lock Loop) circuit, for example. The internal clock 103 provides a local clock of the PLC 100. This local clock is also used as a basis of time stamps that are assigned to data.

The chipset 104, typically, is constituted in line with general-purpose computer architecture. For example, the chipset 104 performs processing such as exchanging data with various components that are connected, and caching data such as that generated as a result of computational processing by the processor 101. Also, the chipset 104 mediates exchange of data between the processor 101, the memory 102 and the interface unit 105 that is performed via the internal bus 110.

The interface unit 105 is provided with connectors such as a USB (Universal Serial Bus) connector and serial and parallel ports, for example. The interface unit 105 is provided with a local bus 105a and a field bus 105b. The local bus 105a acquires data from a connected sensor 81, and sends a control signal to an actuator 82 of a control target. Similarly, the field bus 105b acquires data from a connected sensor 83, and sends a control signal to an actuator 84 of a control target.

The memory 102 stores an NTP log 102a, a time-series database 102b, a control program 102c and learning data 102d.

The memory 102 is, for example, a storage element such as a RAM (Random Access Memory) or a ROM (Read Only Memory) or a storage device such as an HDD (Hard Disk Drive). In addition, a semiconductor memory such as a flash memory or a SDRAM (Synchronous Dynamic RAM) or a nonvolatile memory such as an EPROM (Erasable Programmable ROM) or an EEPROM (Electrically Erasable Programmable ROM), for example, may be used.

The processor 101 is provided with a correction unit 101a, a data collection unit 101b, an extraction unit 101c, a modification unit 101d, a response unit 101e, a learning unit 101f and a determination unit 101g as processing means according to an embodiment. These constituent elements can be realized by computational processing that is executed by a CPU in accordance with the control program 102c, for example.

The correction unit 101a repeatedly corrects the local clock of the internal clock 103. That is, the correction unit 101a accesses the time server 400 (FIG. 1) on a regular basis at a frequency of once per day, for example, and executes correction processing of the local clock. For example, in a Unix(registered trademark)-like system, time correction processing can be executed using an NTPD command. The history of time correction processing is stored in the memory 102 as an NTP log.

Figure 6:
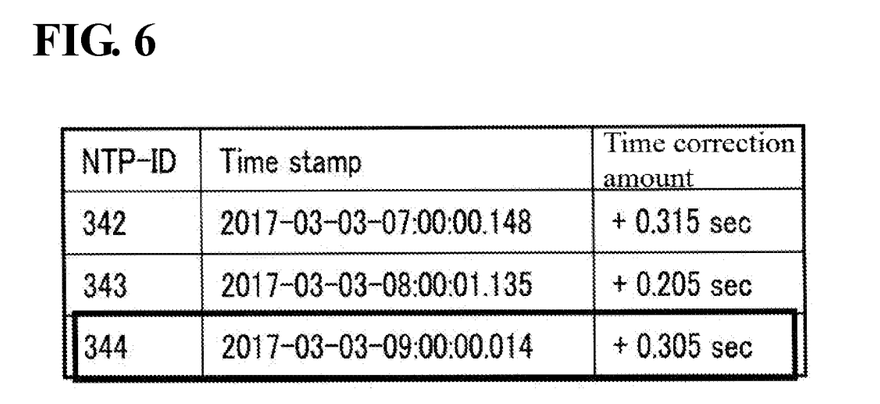
FIG. 6 is a diagram illustrating an example of an NTP log.

FIG. 6 is a diagram showing an example of the NTP log 102a that is stored in the memory 102. The NTP log 102a is a database in which the time correction amount for each iteration of correction processing is tabulated in association with an identifier (ID) for identifying the iteration of correction processing. Furthermore, a time stamp of the point in time at which the correction processing was executed may also be recorded together with the time correction amount and the ID, as shown in the diagram. It is evident, on referring to the interval of the time stamps, that correction processing of the local clock is executed in 1 hour cycles. For example, the time correction amount for the ID "344" is +0.305 sec (seconds).

Note that if a system log is created by an OS (Operating System) installed in the PLC 100, it is also possible to extract required information from this system log to create the NTP log 102a.

The data collection unit 101b collects data related to a controlled object in cycles of milliseconds or microseconds, for example. The collected data is assigned a time stamp of the point in time at which the data was collected, for example, and stored in the time-series database 102b of the memory 102.

Figure 7:
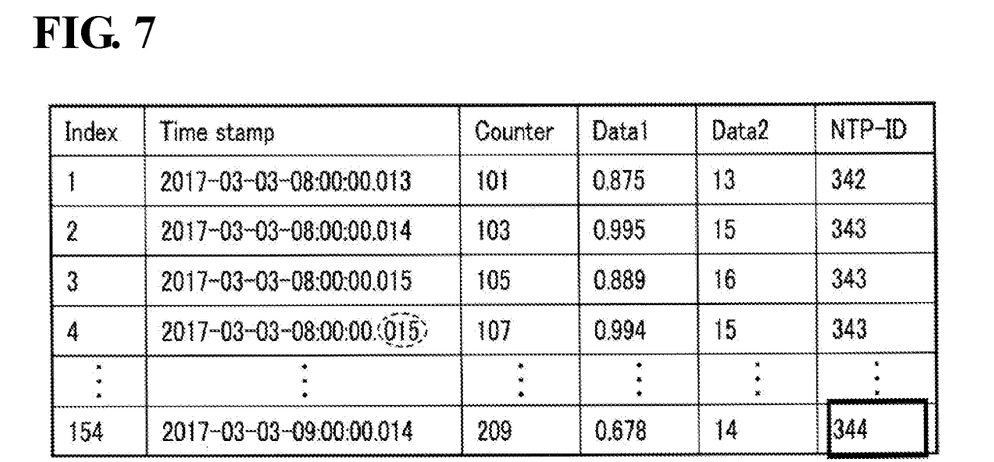
FIG. 7 is a diagram illustrating an example of a time-series database 102b.

FIG. 7 is a diagram showing an example of the time-series database 102b stored in the memory 102. The time-series database 102b is a database designed in preparation for responding to queries that include designation of a period, and can be utilized as an embedded database of the PLC 100. As shown in FIG. 7, the time-series database 102b is a database in which a plurality of records are recorded in association with indexes.

Each record includes data with a time stamp attached (Data1, Data2) that was transferred from the data collection unit 101b and the ID (NTP-ID) of the correction processing of the local clock from which the time stamp of the data derives. In other words, a record according to an embodiment has a data structure including data related to the controlled object of the PLC 100, a time stamp thereof, and an ID for identifying the correction processing of the local clock. Furthermore, a counter value (Counter) may also be included in the record. The counter value is a count value of the local clock pulse from a reference time, for example.

In FIG. 7, the time stamp of the record of the lowermost index 154 is "2017-03-03-09:00:00.014." This time stamp would have been attached based on the local clock corrected at a certain point in time, and the column for distinguishing the correction processing thereof is NTP-ID. The NTP-ID of the record 154 is "344", and it is evident, on referring to FIG.

6, that the local clock from which the time stamp "2017-03-03-08:00:00.014" derives was corrected at the point in time "2017-03-03-09:00:00.014".

In other words, the record 154 shows that the data was acquired precisely at the point in time at which the time correction was executed. However, errors accumulate on the time stamps over time. An embodiment discloses a technology for dealing with this.

The description will now return to FIG. 5. The extraction unit 101c extracts data corresponding to the period designated by the query directed to the time-series database 102b from the time-series database 102b. The modification unit 101d modifies the time stamp of the extracted data, based on the time correction amount of the NTP log 102a.

The response unit 101e sends the data with the modified time stamp to the issuer of the query. Note that the sender of the query may be a process (service) of the PLC 100 itself, or may be the PC 200, a higher level server, or the like.

The learning unit 101f creates learning data related to the accuracy of the correction processing, by feedback learning that uses the time correction amount for each iteration of correction processing. The created learning data is stored in the memory 102 (learning data 102d). The correction unit 101a may execute correction processing of the local clock with reference to this learning data 102d.

The determination unit 101g determines the validity of the correction processing of the local clock. For example, when it is determined by the determination unit that correction processing is not valid, the correction unit 101a disables that correction processing. For example, there are cases where the time correction amount oscillates or correction processing is executed with an incorrect time zone setting due an unforeseen error. Such problems can be prevented by providing the determination unit 101g.

Note that the correction unit 101a, the data collection unit 101b, the extraction unit 101c, the modification unit 101d, the response unit 101e, the learning unit 101f and the determination unit 101g can be implemented as a POU that is developed in a PLC program IDE or as an FB, for example. A POU is a unit of an execution model of a computer program in IEC 61131-3. As a basic unit constituting an entire user program, there are three types of POUs, namely, a computer program, an FB and a function, that describe an algorithm and a local variable table.

A function is a POU that is used when creating a component whose output is uniquely determined with respect to an input, such as computational processing. An FB is a POU that is used when creating a component whose output may differ with respect to the same input depending on the state, such as a timer or a counter. A computer program is one of three types of POUs, along with a function and an FB, that operates upon being allocated a task.

Figure 8:
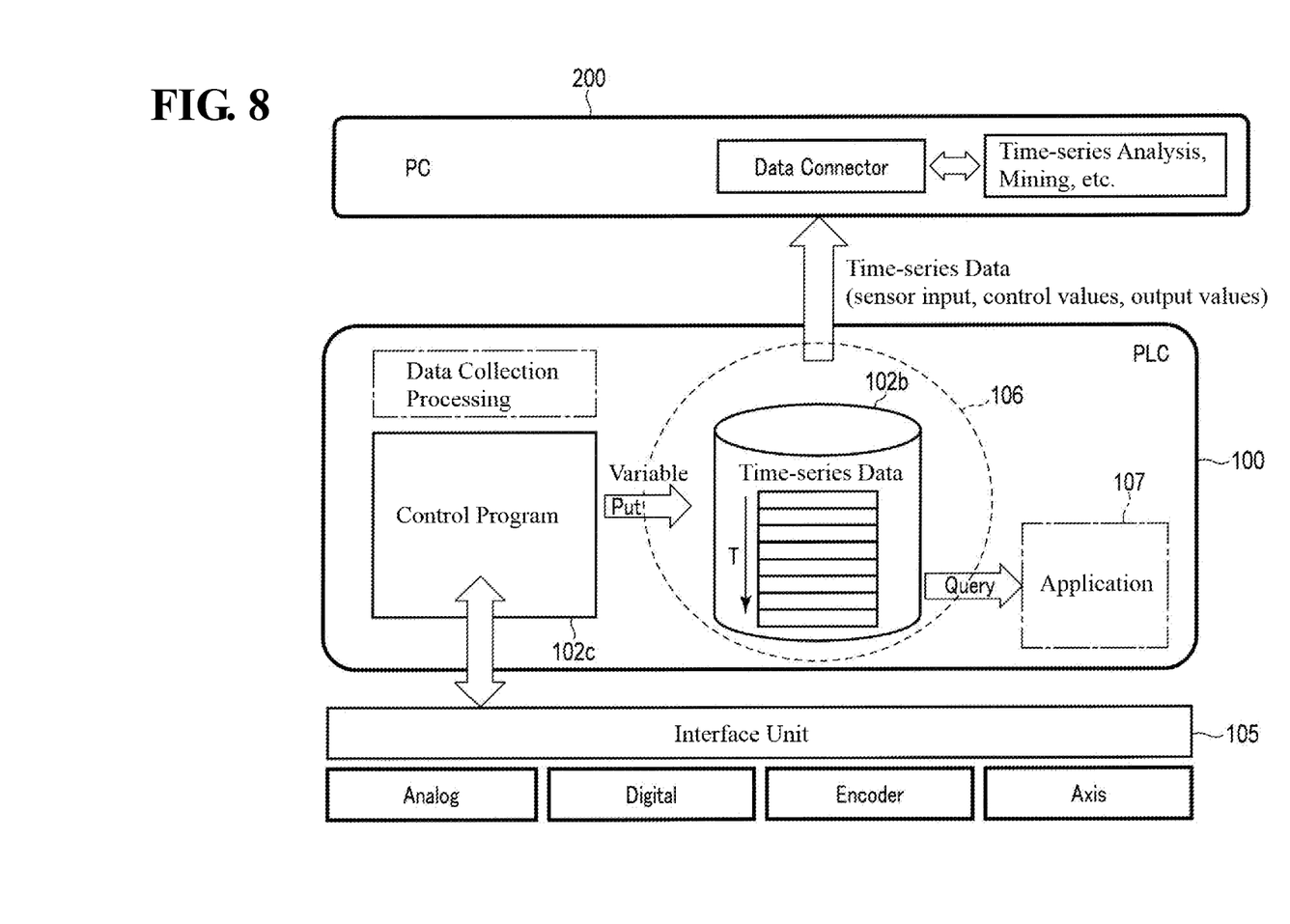
FIG. 8 is a schematic diagram illustrating an example of dataflow between blocks according to an embodiment.

FIG. 8 is a schematic diagram showing an example of the dataflow between blocks according to an embodiment. Data such as analog data (Analog), digital data (Digital), the rotation amount of an encoder (Encoder) and the angle data of an axis (Axis) is converted to a predetermined format in the interface unit 105. This data is uploaded to the PLC 100 as a result of data collection processing (data collection unit 101b) by the control program 102c, and is mapped to a variable value.

The data collection unit 101b assigns a time stamp to the variable value, and writes the resultant data to the time-series database 102b. This operation is realized by transferring data to a shell 106 of the time-series database 102b with PUT in SQL syntax, for example. This processing corresponds to INSERT for a relational database (RDB).

Also, when a query is transferred from an application 107 to the shell 106, data designated by this query is extracted. Thus, the time-series database 102b may be provided with the aspect of serving as a daemon that sequentially responds to interruptions from processes.

Furthermore, the time-series database 102b can be copied to a memory card or the like, for example, and desired time-series data (sensor input, control values, output values, etc.) can also be transferred to the PC 200 via a data connector. The PC 200 is able to perform processing such as time-series analysis and data mining using acquired time-series data. Next, the operation of an embodiment will be described on the basis of the above configuration.

Figure 9:
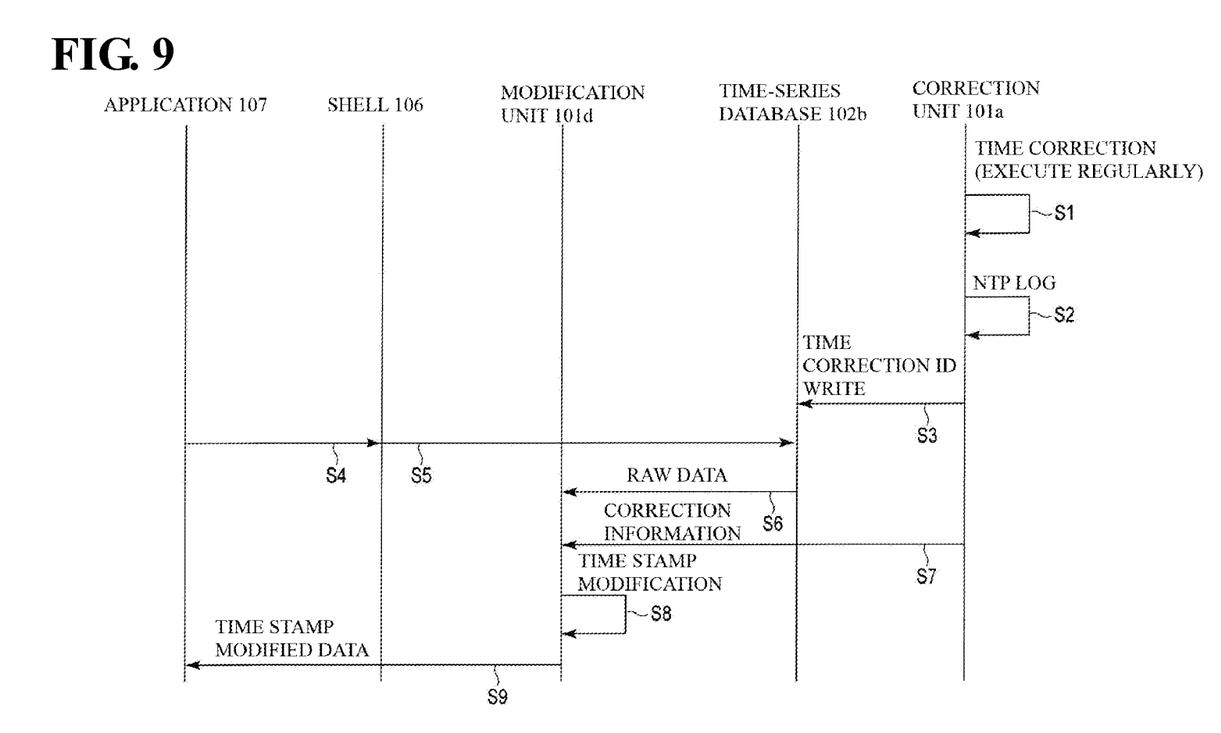
FIG. 9 is a sequence chart illustrating an example of a processing procedure according to an embodiment.

FIG. 9 is a sequence chart showing an example of a processing procedure according to an embodiment. In FIG. 9, the correction unit 101a executes time correction of the local clock on a regular basis (step S1). Whenever time correction processing is executed, a history thereof is recorded to the NTP log 102a (step S2). In other words, the time correction amount and the NTP-ID are recorded to the NTP log 102a. The same ID as the NTP log 102a is also written to the NTP-ID column of the time-series database 102b (FIG. 7) (step S3).

For example, assume that a query that designates "2017-03-03-08:00" as the time range is received from the application 107 of FIG. 8 (step S4). Then, the shell 106 (FIG. 8) starts a data readout process on the time-series database 102b (step S5). In response, data (RAW data) whose time stamp has not been modified is read out from the time-series database 102b and transferred to the modification unit 101d (step S6).

Also, the modification unit 101d acquires correction information from the correction unit 101a (step S7). In other words, the modification unit 101d acquires NTP-IDs corresponding to the time range of the query and time correction amounts thereof from the NTP log 102a. On the basis of this information, the modification unit 101d modifies the time stamp of the extracted data (step S8).

Assume that a query of a time range that includes the records of indexes 1 to 4 of FIG. 7 is received. Focusing on record 4, the time stamp of the RAW data is "2017-03-03-08:00.015" and the NTP-ID is 343. Therefore, the modification unit 101d acquires a time correction amount of 0.205 corresponding to the ID "343" from the NTP log 102a.

The modification unit 101d calculates the time deviation amount per unit time (e.g., 1 μsec), by dividing the acquired time correction amount of 0.205 by the operation interval of the NTP (e.g., 1 hr). For example, the time deviation amount per unit time can be calculated using the following equation (1).

$$\text{Time deviation amount/time} = 0.205/(60 \times 60) \quad (1)$$

Alternatively, the interval of the NTP may be calculated from the time stamp of the NTP log 102a (FIG. 6), as shown in the following equation (2).

$$\text{Time deviation amount/time} = 0.205/(\text{``2017-03-03-09:00.014''} - \text{``2017-03-03-08:00.035''}) \quad (2)$$

Next, the modification unit 101d calculates the time modification amount to be applied to each record, by multiplying the time deviation amount per unit time by the elapsed time period from the NTP operation time. For example, with respect to record 4, the elapsed time period from the NTP operation time is "2017-03-03-08:00.015"– "2017-03-03-07:00.148". The time modification amount can be calculated, by multiplying "time deviation amount/time" by this elapsed time period, as in the following equation (3).

$$\text{Time modification amount} = \text{time deviation amount}/\text{time} \times \text{elapsed time period from NTP operation time} \quad (3)$$

Calculations such as described using equations (1) to (3) are, in short, proportional distributions. In other words, the modification unit 101*d* modifies the time stamp of each record, based on a value obtained by interpolating the acquired time correction amount on the basis of the time at which the NTP processing was executed.

Figure 10:
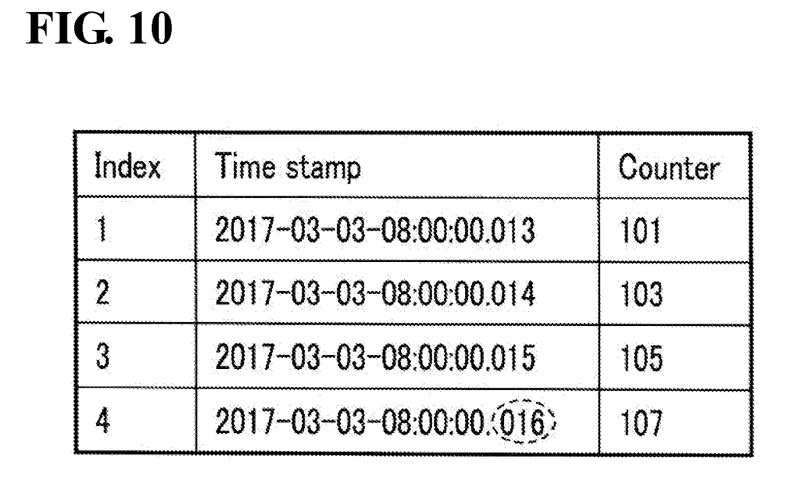
FIG. 10 is a diagram illustrating an example of data whose time stamps have been modified.

FIG. 10 is a diagram showing an example of data whose time stamp has been modified that is to be sent to the query source. It is evident that the time stamp of record 4 has been modified to "2017-03-03-08:00.016."

In an embodiment as described above, data is recorded to the time-series database 102*b* embedded in the PLC 100. Also, the PLC 100 accesses the time server 400, which is an NTP server or the like, on a regular basis and corrects the local clock of the PLC 100. At this time, the time correction amount and the NTP-ID for identifying each iteration of the correction processing are recorded to the NTP log 102*a* in association with each other. When a query arrives, the time stamp of the record corresponding to the designated time range is modified by proportionally distributing the time correction amount of the corresponding NTP-ID.

As a result, the data whose the time stamp has been modified is sent to the sender of the query. In other words, an accurate time stamp can be output.

Accordingly, it becomes possible to implement data analysis based on accurate time information. Therefore, effects such as improvement in the accuracy of torque correction of a servo motor and improvement in the accuracy of the time-series analysis of speed data can be obtained, for example.

Also, in an embodiment, because the time stamp of original binary data (RAW data) is not modified, generated data can be maintained in the original state.

Also, because the learning unit 101*f* performs feedback learning of the error correction accuracy from the statistical information of time correction, it is possible to realize more optimal time correction. Furthermore, the determination unit 101*g* determines the validity of the time correction processing, and correction is disabled in the case where the time correction is not valid. Accordingly, it is possible to avoid a continuation of the state in which time deviation occurred.

According to an embodiment, it becomes possible to provide a control device capable of acquiring data to which an accurate time stamp has been assigned, a time stamp modification method, a computer program and a data structure.

Note that this invention is not limited to the above embodiment. For example, a computer program of the PLC 100 according to an embodiment can also be recorded to a recording medium or provided via a network. The term "processor" that is used in relation to a computer can be understood to be a CPU or GPU (Graphics Processing Unit), or a circuit such as an FPGA or an ASIC (Application Specific Integrated Circuit), SPLD (Simple Programmable Logic Device) or CPLD (Complex Programmable Logic Device).

The processor, by reading out and executing a computer program stored in the memory, executes a particular processing procedure that is based on the computer program. A configuration can also be adopted in which, instead of a memory, the computer program is embedded directly within the circuitry of the processor. In this case, the processor executes the particular processing procedure by reading out and executing the computer program embedded within the circuitry.

Also, at least part of the control system of an embodiment may be constituted by a cloud server device. That is, at least part of the processing procedure that is executed by the control system of an embodiment may be executed by cloud computing.

Cloud computing includes at least one of SaaS (Software as a Service) that provides applications (software) as a service, PaaS (Platform as a Service) that provides a base (platform) for running applications as a service, and IaaS (Infrastructure as a Service) that provides resources such a server device, a central processing unit and a storage as a service (public cloud). For example, this Cloud computing may include remote operation via the Internet, using a cloud service provision layer (PaaS).

Also, the type of database is not limited to a time-series database. Some of the blocks of the PLC 100 can also be implemented in the PC 200.

Furthermore, rather than the stand-alone PLC 100, by implementing similar blocks in another database (high level database), and modifying time stamps between the plurality of databases, the data of different databases can be integrated with high accuracy.

In addition, with regard to the form of the system, the protocols of the network, the technique for installing computer programs, the type (target values, result values, etc.) of data that is acquired, and the processing procedures and processing contents of PLCs, it is possible to implement various modifications without departing from the spirit of this invention.

In short, this invention is not strictly limited to an embodiment as described above, and constituent elements can be embodied through modification at the implementation stage without departing from the spirit of the invention. Also, embodiments can be formed by appropriately combining a plurality of the constituent elements that are disclosed in the above embodiment. For example, some of the constituent elements may be omitted from the total number of constituent elements that are shown in an embodiment. Furthermore, constituent elements spanning different embodiments may be appropriately combined.

Although the above embodiment can also be partially or wholly described as in the following supplementary remarks, the invention is not limited thereto.

Supplementary Remark 1

A control device including a local clock that provides a local time serving as a basis of a time stamp, a processor, and a storage unit, the processor being configured to:

repeatedly execute correction processing of the local time, cause the storage unit to store a time correction amount for each iteration of the correction processing, collect data related to a controlled object, store the collected data in a database of the storage unit, with the time stamp attached to the data, extract, from the database, data corresponding to a period designated by a query directed to the database, and modify the time stamp of the extracted data, based on the time correction amount.

Supplementary Remark 2

A time stamp modification method including:

repeatedly executing correction processing of a local time provided by a local clock, using at least one processor;

causing a storage unit to store a time correction amount for each iteration of the correction processing, using at least one processor;

collecting data related to a controlled object, using at least one processor;

storing the collected data in a database, with a time stamp based on the local time attached to the data, using at least one processor;

extracting, from the database, data corresponding to a period designated by a query directed to the database, using at least one processor; and modifying the time stamp of the extracted data, based on the time correction amount, using at least one processor.

The invention claimed is:

1. A control device comprising:
a memory;
a local clock circuit; and
a processor configured to perform operations comprising:
operation as a correction unit configured to repeatedly execute correction processing of a local time provided by the local clock circuit in which the local time is capable of being synchronized with a network time, the local time comprising a time upon which time stamps are based, the correction processing executed at a first interval;
operation as a storage unit configured to store a time correction amount for each iteration of the correction processing in the memory together with a first time stamp of a first point in time according to the local time, at which a respective iteration of correction processing was performed;
operation as a data collection unit configured to collect a plurality of data elements related to a controlled object at a second interval;
operation as a database configured to store the collected plurality of data elements in the memory, with a respective second time stamp attached to each data element of the plurality of data elements, the respective second time stamp indicating, for each respective data element, a second point in time according to the local time, at which the respective data element was collected;
operation as an extraction unit configured to extract, from the database, data elements of the plurality of data elements corresponding to a period designated by a query directed to the database;
operation as a modification unit configured to, for each of the extracted data elements, modify the respective second time stamp, based on the time correction amount of the iteration of correction processing to which a respective first time stamp and the respective second time stamp correspond, by:
calculating a time deviation per unit time comprising an amount by which a difference between the local time and the network time changes per each unit of time, by dividing the time correction amount to which the respective first time stamp corresponds by: an operation interval of the correction unit; or an elapsed time between iterations of the correction processing;
calculating a time modification amount, for modifying the respective second time stamp, by multiplying the time deviation per unit time by an elapsed time between a first time indicated by the respective first time stamp and a second time indicated by the respective second time stamp; and
applying the time modification amount to the respective second time stamp; and operation as a response unit configured to send the extracted data elements with the modified respective second time stamps attached thereto to an issuer of the query.

2. The control device according to claim 1,
wherein
the processor operating as the storage unit stores in the memory the time correction amount for each iteration of the correction processing in association with an identifier for identifying the iteration of the correction processing,
the processor operating as the database stores in the memory, for each of the collected plurality of data elements, a record that includes the data element with the respective second time stamp attached thereto and the identifier of the iteration of the correction processing of the local time to which the respective first time stamp of iteration and the respective second time stamp the data element correspond, and
the processor operating as the modification unit acquires the time correction amount corresponding to the identifier included in the record each of the extracted data elements, and modifies the respective second time stamp of the extracted data element, based on the acquired time correction amount.

3. The control device according to claim 2,
wherein the processor operating as the modification unit modifies the respective second time stamp based on the time modification amount comprising an interpolated value obtained based on: the acquired time correction amount; the respective first time stamp, corresponding to the acquired time correction amount; the elapsed time between the first time indicated by the respective first time stamp and the second time indicated by the respective second time stamp; and a time indicated by a first time stamp other than the respective first time stamp.

4. The control device according to claim 1,
wherein the processor operating as the database operates as a time-series database configured to respond to a query that includes designation of the period.

5. The control device according to claim 1,
wherein the processor operating as the correction unit accesses a time server providing a global time and executes correction processing of the local time based on a difference between the global time and the local time.

6. The control device according to claim 1,
wherein the processor operating as the data collection unit collects the data at the second interval that comprises a higher frequency of collection of the plurality of data elements than a frequency comprised in the first interval of executing the correction processing by the correction unit.

7. The control device according to claim 1, wherein
the processor is configured to perform operations further comprising operation as a learning unit configured to create learning data related to accuracy of the correction processing by feedback learning that uses the time correction amount for each iteration of the correction processing, and
the processor operating as the correction unit corrects the local time with reference to the created learning data.

8. The control device according to claim 1, wherein the processor is configured to perform operations further comprising operation as a determination unit configured to determine a validity of the correction processing of the local time, and the processor operating as the correction unit disables correction processing in response to determining by the determination unit that the correction processing is not valid.

9. A time stamp modification method comprising:
repeatedly executing correction processing of a local time provided by a local clock circuit in which the local time is capable of being synchronized with a network time, the correction processing executed at a first frequency;

causing a storage unit to store a time correction amount for each iteration of the correction processing in a memory together with a first time stamp of the point in time at which a respective iteration of correction processing was performed;

collecting a plurality of data elements related to a controlled object;

storing the collected plurality of data elements in a database, with a second time stamp attached to each data element of the plurality of data elements, the second time stamp indicating for each respective data element, a point in time at which the respective data element was collected;

extracting, from the database, data elements of the plurality of data elements corresponding to a period designated by a query directed to the database; and modifying, for each of the extracted data elements, the respective second time stamp based on the time correction amount of the iteration of correction processing to which a respective first time stamp and a respective second time stamp correspond, by:

calculating a time deviation per unit time comprising an amount by which a difference between the local time and the network time changes per each unit of time, by dividing the time correction amount to which the respective first time stamp corresponds by: an operation interval; or an elapsed time between iterations of the correction processing;

calculating a time modification amount, for modifying the respective second time stamp, by multiplying the time deviation per unit time by an elapsed time between a first time indicated by the respective first time stamp and a second time indicated by the respective second time stamp; and applying the time modification amount to the respective second time stamp.

10. A non-transitory computer-readable storage medium storing a computer program that includes a command for causing a computer to execute the method according to claim 9.

11. A data storage system for a computer memory in a control device comprising:

the computer memory;
a local clock circuit; and
a processor configured with a program to perform operations comprising:

repeatedly executing correction processing of a local time provided by the local clock circuit in which the local time is capable of being synchronized with a network time, the local time comprising a time upon which time stamps are based, the correction processing executed at a first interval, wherein
the data storage system comprises:

a first portion of the computer memory in which a time correction amount for each iteration of the correction processing together with a first time stamp of a first point in time according to the local time, at which a respective iteration of correction processing was performed is stored; and a second portion of the computer memory in which a time-series database comprising a plurality of records are stored in association with respective indexes, wherein each of the records is organized according to a data structure comprising:

a data element related to a controlled object of the device;

a second time stamp assigned to the data element, the second time stamp indicating a time of the local clock circuit at which the data element was collected; and an identifier for identifying a value of correction processing of the second time stamp such that the second time stamp is modified according to the value of correction processing to correct errors in the local clock circuit, the processor is configured with the program to perform operations further comprising modifying the second time stamp by, for each data element:

calculating a time deviation per unit time comprising an amount by which a difference between the local time and the network time changes per each unit of time, by dividing the identified value of correction processing by: an operation interval of the correction processing; or an elapsed time between iterations of the correction processing;

calculating a time modification amount, for modifying the second time stamp, by multiplying the time deviation per unit time by an elapsed time between a first time indicated by the first time stamp and a second time indicated by the second time stamp; and applying the time modification amount to the second time stamp.

* * * * *